United States Patent
Neumann

(10) Patent No.: US 7,831,458 B2
(45) Date of Patent: Nov. 9, 2010

(54) METHOD AND SYSTEM FOR SUPPLYING A NUMBER OF SERVICE PROVIDERS WITH TECHNICAL SERVICE DEVICES

(75) Inventor: Bernd Neumann, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1431 days.

(21) Appl. No.: 10/552,196

(22) PCT Filed: Apr. 8, 2004

(86) PCT No.: PCT/DE2004/000755

§ 371 (c)(1),
(2), (4) Date: Oct. 6, 2005

(87) PCT Pub. No.: WO2004/092986

PCT Pub. Date: Oct. 28, 2004

(65) Prior Publication Data

US 2006/0277085 A1    Dec. 7, 2006

(30) Foreign Application Priority Data

Apr. 9, 2003    (DE)    ................................ 103 16 481

(51) Int. Cl.
G05B 19/418    (2006.01)
(52) U.S. Cl. ........................................... 705/8; 705/28
(58) Field of Classification Search ........................ None
See application file for complete search history.

(56) References Cited

U.S. PATENT DOCUMENTS 4,937,743 A * 6/1990 Rassman et al. ................ 705/8

(Continued)

FOREIGN PATENT DOCUMENTS

DE    197 28 885 A1    1/1999

(Continued)

OTHER PUBLICATIONS

L. Haugen, "A Study of Scheduling and Quality of Field-Service Support Systems," Ph.D. Thesis, University of Minnesota, Nov. 1993, pp. 1-251.*

(Continued)

Primary Examiner—Romain Jeanty
Assistant Examiner—Gurkanwaljit Singh

(57) ABSTRACT

A method for supplying a number of service providers with technical service devices makes is possible to reduce the expense incurred by a service provider for supplying its service employees with service devices and simultaneously and to improve the service processes of the service provider and/or its quality of service. According to the invention, a number of service devices are assigned to each of the service providers, and each of the service providers respectively perform services at a number of facility locations that are located at locations different from storage locations for service devices thereof. The inventive method comprises the followings steps: managing the service devices via a device service provider to which the respective number of service devices can be made available by the service providers, with the aid of a data processing system, whereby each of the service providers can access the data processing system, and a delivery of one or more service devices of the service provider to a desired facility location can be requested via the data processing system; delivering the requested service device(s) to the desired facility location via the device service provider.

16 Claims, 8 Drawing Sheets

U.S. PATENT DOCUMENTS

| | | | | |
|---|---|---|---|---|
| 5,111,391 | A * | 5/1992 | Fields et al. | 705/9 |
| 5,467,268 | A * | 11/1995 | Sisley et al. | 705/9 |
| 5,623,404 | A * | 4/1997 | Collins et al. | 705/9 |
| 5,682,421 | A * | 10/1997 | Glovitz et al. | 379/100.05 |
| 5,920,846 | A * | 7/1999 | Storch et al. | 705/7 |
| 6,070,155 | A * | 5/2000 | Cherrington et al. | 705/400 |
| 6,173,128 | B1 * | 1/2001 | Saber et al. | 399/24 |
| 6,351,621 | B1 * | 2/2002 | Richards et al. | 399/111 |
| 6,606,744 | B1 * | 8/2003 | Mikurak | 717/174 |
| 6,735,293 | B2 * | 5/2004 | Doherty et al. | 379/201.12 |
| 6,879,962 | B1 * | 4/2005 | Smith et al. | 705/22 |
| 6,922,687 | B2 * | 7/2005 | Vernon | 707/1 |
| 6,961,415 | B2 * | 11/2005 | Doherty et al. | 379/201.12 |
| 7,171,372 | B2 * | 1/2007 | Daniel et al. | 705/7 |
| 7,478,060 | B2 * | 1/2009 | Goldsmith et al. | 705/29 |
| 7,620,562 | B2 * | 11/2009 | Henry et al. | 705/9 |
| 2001/0051905 | A1 * | 12/2001 | Lucas | 705/29 |
| 2002/0022984 | A1 * | 2/2002 | Daniel et al. | 705/8 |
| 2002/0072956 | A1 * | 6/2002 | Willems et al. | 705/10 |
| 2002/0082966 | A1 * | 6/2002 | O'Brien et al. | 705/36 |
| 2002/0094207 | A1 * | 7/2002 | Richards et al. | 399/8 |
| 2002/0107767 | A1 * | 8/2002 | McClair et al. | 705/35 |
| 2002/0115447 | A1 * | 8/2002 | Martin et al. | 455/456 |
| 2002/0161600 | A1 * | 10/2002 | Stubiger et al. | 705/1 |
| 2002/0181685 | A1 * | 12/2002 | Doherty et al. | 379/201.12 |
| 2002/0194047 | A1 * | 12/2002 | Edinger et al. | 705/9 |
| 2003/0003909 | A1 * | 1/2003 | Keronen et al. | 455/434 |
| 2003/0028408 | A1 * | 2/2003 | RuDusky | 705/8 |
| 2003/0120677 | A1 * | 6/2003 | Vernon | 707/102 |
| 2003/0172002 | A1 * | 9/2003 | Spira et al. | 705/27 |
| 2004/0059810 | A1 * | 3/2004 | Chess et al. | 709/224 |
| 2004/0064351 | A1 * | 4/2004 | Mikurak | 705/7 |
| 2004/0107131 | A1 * | 6/2004 | Wilkerson et al. | 705/10 |
| 2004/0117046 | A1 * | 6/2004 | Colle et al. | 700/99 |
| 2004/0128204 | A1 * | 7/2004 | Cihla et al. | 705/26 |
| 2004/0190699 | A1 * | 9/2004 | Doherty et al. | 379/201.12 |
| 2004/0193506 | A1 * | 9/2004 | Zmolek | 705/27 |
| 2005/0010663 | A1 * | 1/2005 | Tatman et al. | 709/224 |
| 2006/0233331 | A1 * | 10/2006 | Maestas et al. | 379/114.01 |

FOREIGN PATENT DOCUMENTS

| | | |
|---|---|---|
| EP | 0 306 965 A2 | 3/1989 |
| EP | 0 669 586 A2 | 8/1995 |

OTHER PUBLICATIONS

John McLaughlin, Jaideep Motwani, Manu S Madan, & A Gunasekaran. (2003). Using information technology to improve downstream supply chain operations: A case study. Business Process Management Journal, 9(1), 69-80.*

Trevor Foster. (Jan. 2000). Performance contracting can yield significant returns. Facilities Design & Management, 19(1), 34-35.*

Frances Richards. (Apr. 2001). Maximizing efficiency. Motion System Design, 43(4), 13. Retrieved Jun. 10, 2010, from Career and Technical Education.*

Bridget McCrea. (Mar. 1999). Conquering the industrial tool market. Industrial Distribution, 88(3), F12-F14.*

* cited by examiner

FIG 5

Inventory information

Total storage inventory: 0
Total loan inventory: 2

Material number: 213001
Serial number:

Storage inventory

| Material | Storage site Storage loc. | Storage inventory | Serial number | TC | Cost center |
|---|---|---|---|---|---|

Loan inventory

| Material no./ Serial no. | Personnel no./ Name, First name | | Loan inventory |
|---|---|---|---|
| 213001 1 | 00113344 | WAGNER, PETER | 1 |
| 213001 2 | 00113344 | POPELAK, DIETER | 1 |

FIG 6

Release

Vacancy:

Release all items

| Pers. no. | Material | Price | Qty | Total | Date | Release |
|---|---|---|---|---|---|---|
| 00112233 | 913076 | 51,84 | 1 | 51,84 | 03.01.2003 13:56:55 | Process |
| 00112233 | 913082 | 86,46 | 1 | 86,46 | 03.01.2003 13:56:55 | Process |
| 000677788 | 913070 | 51,84 | 1 | 51,84 | 07.01.2003 18:49:21 | Process |
| 00115533 | 713543 | 73,8 | 1 | 73,8 | 08.01.2003 10:36:28 | Process |

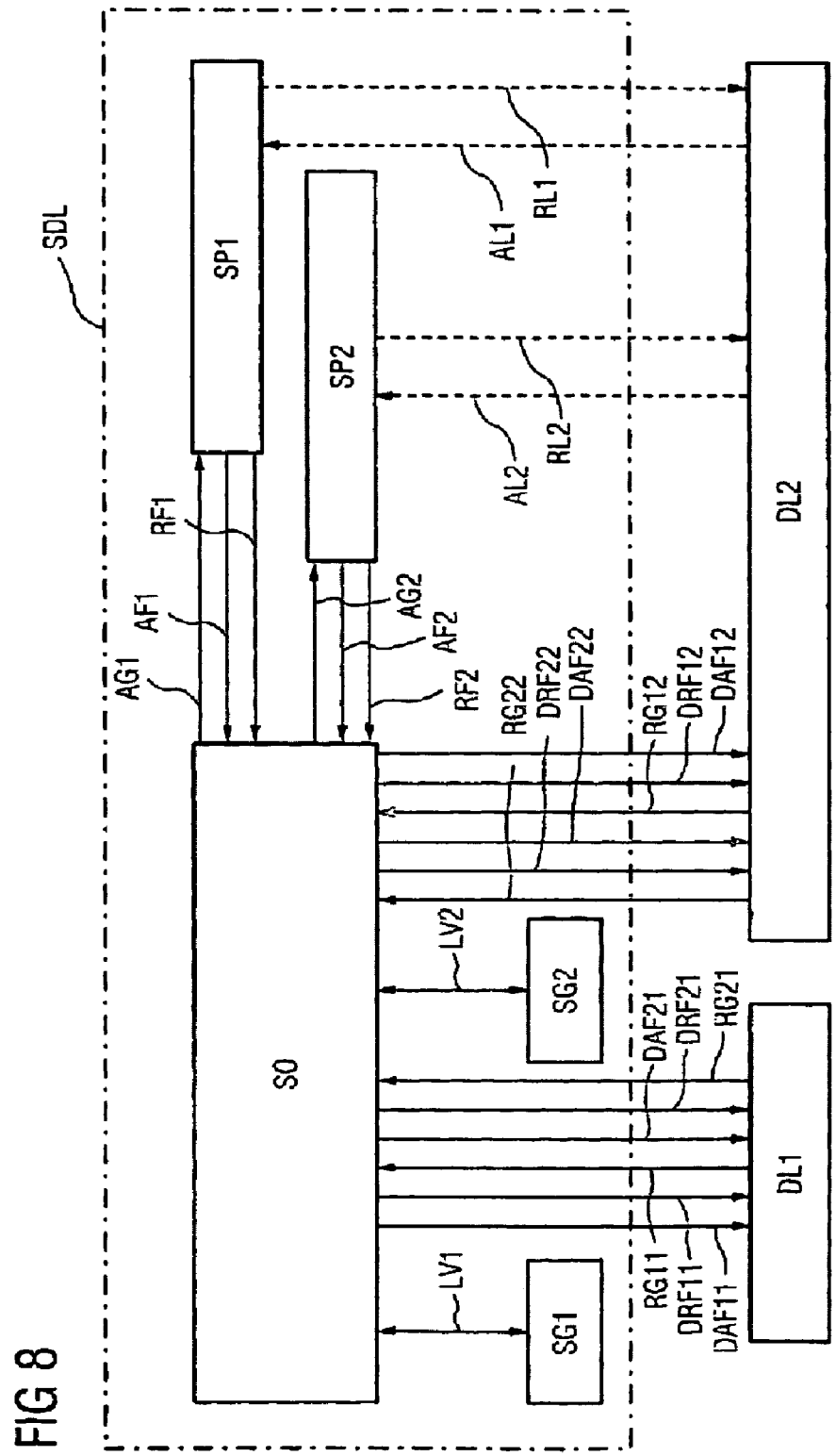

METHOD AND SYSTEM FOR SUPPLYING A NUMBER OF SERVICE PROVIDERS WITH TECHNICAL SERVICE DEVICES

CROSS REFERENCE TO RELATED APPLICATIONS

This application is the US National Stage of International Application No. PCT/DE2004/000755, filed Apr. 8, 2004 and claims the benefit thereof. The International Application claims the benefits of German application No. 10316481.2, filed Apr. 9, 2003, both applications are incorporated by reference herein in their entirety.

FIELD OF INVENTION

The present invention relates to a method and system for supplying a number of service providers with technical service devices.

SUMMARY OF THE INVENTION

In technical installations, numerous activities, in the area of fault recovery, testing and maintenance for example, are performed by technical service providers. Service providers of this kind, e.g. after-sales service, quality assurance or maintenance departments of large organizations or specialist service companies, sometimes employ up to several thousand service personnel who are managed and administered by a service organization and who perform their services mainly on a plurality of installations at different locations. Installations of this kind can be, for example, industrial facilities, hospitals, airports, large buildings, telecommunications equipment or power generation and distribution plants.

In order to provide the services, e.g. rectifying faults in industrial facilities, different, in some cases highly specialized, technical equipment objects (referred to in the following as "service devices"), such as, for example, tools, instruments, testing and measuring equipment, are required. Service providers therefore possess a multiplicity of service devices which they make available to their service personnel for their service assignments.

Whether it is a matter of simple manual and consumable tools, specific implements tailored to the particular service assignment or highly sensitive measurement and testing instruments, it all requires comprehensive logistical organization in order to achieve timely deployment at the correct location and not infrequently ties up considerable resources for administration and inventory management on the part of the service organization. This is particularly the case when the services are provided at installation sites that are located at different geographical locations to storage sites of the service devices.

FIG. 7 shows a service process of a service provider for a fault recovery scenario and the effect of the tool and instrument provisioning on the service process and consequently also on the service quality. Similar processes are essentially found in quality assurance and maintenance departments.

A fault occurring at time is at an installation site is reported to the service provider at time tse. After the response time trk has elapsed, a service employee is notified at time t1 by his service organization via a service order and makes preparations to deal with it. He requires the setup time trn in order to clarify which service devices he requires and to requisition said devices, so he cannot set off for the installation site affected by the fault until time t2. He arrives at the installation site at time t3, as a result of which an onsite time ta=t3−tse is defined. The service employee requires time te to fix the fault on the object, so said object is available again from time t4. The employee leaves the installation site again at time t5 and returns to his service base again at time t6. Only after completion of follow-up activities, for which he requires a post-processing time tn, is the entire order closed for the service employee at time t7.

The following are examples of problems that can occur in this scenario and adversely affect the service process and/or the service quality:

With regard to the setup time trn:
Measuring instrument is not available and must first be procured
Measuring instrument is not ready for use because it is incomplete
Toolkit is incomplete With regard to the fix time te:
Incorrect measurement results due to lack of calibration of a test instrument
Diagnosis is not possible because the wrong service device has been supplied
Use of outdated service devices requires more time for fault recovery With regard to the post-processing time tn:
Where to take defective measuring instruments?
Who can repair a defective measuring instrument?
Obtaining a new device/tool is difficult
On many occasions technical issues need to be clarified between supplier and service engineer Other problems that can occur:
Overhasty decision to acquire an expensive measuring instrument/tool
No cost/benefits study
No overview of the existing device pool
No transparency with regard to device use and device history FIG. 8 shows in a simplified representation by way of example a known process for providing two service employees SP1 and SP2 of a service provider SDL with service devices. The service assignments of the service employees SP1 and SP2 take place at installation sites which are at different geographical locations to storage sites of the service devices. In this illustration, information flows are represented by unbroken lines, and material flows by dashed lines.

The service provider SDL has a first number of service devices SG1 at a first storage site and a second number of service devices SG2 at a second storage site which are administered—as indicated with the aid of the arrows LV1 and LV2—by the service provider's service organization SO. The service organization offers its service employees SP1, SP2 said service devices in the form of service device proposals AG1 and AG2.

After receiving a service order, the service employee SP1 transmits a request AF1 to the service organization SO for delivery of desired service devices to a desired installation site. Said request records the order and now contracts a service provider DL1 by means of a delivery order DAF11 to supply desired service devices from the storage depot of the service devices SG1 to the storage depot of the service devices SG2, the commissioning of the complete consignment and the readying for delivery. For delivery AL1 of the service devices to the service employee SP1, the service organization. SO contracts a second service provider DL2 by means of a delivery order DAF12.

If, at the end of the service device usage time, the service employee SP1 wishes the service devices to be returned to their storage locations, he transmits a return delivery request RF1 to the service organization SO. The latter records the return request RF1 and now contracts in turn the service providers DL1 and DL2 by means of return requests DRF11 and DRF12, respectively, with the return delivery RL1 of the service devices to their respective storage sites. Following completion of the return delivery RL1, the service providers DL1 and DL2 transmit their invoices RG11 and RG12, respectively, to the service organization SO.

In a similar manner, following a delivery request AF2 by the service employee SP2 the service organization makes arrangements via the service providers DL1 and DL2 for a delivery AL2 and, after receiving a return delivery request RF2, for a return delivery RL2 of desired service devices. The information flows taking place during this process correspond to the information flows explained above and are designated in FIG. 8 by means of the subscripted numerals "2" and "21" and "22" in the reference symbols.

For the delivery and return delivery of service devices, the service employees turn to their service organization. Thus, the requests by said service employees must be recorded on the part of the service organization and the availability of the service devices checked in the service device inventories. In the case of the deliveries and return deliveries the service providers DL1 and DL2 must then be selected and monitored.

In order to avoid the aforementioned problems in the service process and/or the service quality, the service providers must maintain an accurate oversight over their service device inventory, monitor inspection schedules and cycles of measuring instruments (e.g. for calibrations) and carry out, document and archive the necessary checks, as well as provide replacement devices for their service employees if necessary. The acquisition of new service devices and the take-back of defective service devices and their repair processing must also be organized by the service providers.

All of these activities necessary for good service device provisioning cause a high labor overhead on the part of the service provider. Often, however, the aforementioned problems in the service process cannot be avoided nonetheless and lead to a degradation of the service process and/or the service quality.

The object of the present invention is therefore to specify a method and a system which permit a reduction in the overhead required on the service provider side for supplying their service employees with service devices and at the same time an improvement in their service process and/or service quality through avoidance of the aforementioned problems to a large extent.

The object directed at the method is achieved according to the invention by a method for supplying a plurality of service providers with technical service devices, wherein each of the service providers is assigned a plurality of service devices in each case and each of the service providers performs services in each case at a plurality of installation sites which are at different locations from storage sites for their service devices, said method comprising the following method steps:
administration, with the aid of a data processing system, of the service devices by a device service provider to which the respective plurality of service devices is made available by the service providers, each of the service providers being able to access the data processing system and to request, via the data processing system, a delivery of one or more of their service devices to a desired installation site,
delivery of the requested service device(s) to the desired installation site by the device service provider.
Advantageous embodiments of the invention are presented in dependent claims.

According to the invention, the respective plurality of the service devices associated with a respective service provider—e.g. on account of ownership—are made available to a device service provider who administers said devices by means of a data processing system. The service devices can be made available, for example, by transfer of possession and provision of information and/or technical data relating to the service devices. The service providers can access the data processing system and request, via the data processing system, a delivery of one or more of their service devices to a desired installation site. Thus, service personnel no longer turn to their service organization when they need a service device, but instead refer to the device service provider. The device service provider subsequently delivers the requested service devices to the desired installation site. The service providers thus relinquish their competency in service device provisioning to their service employees to the device service provider and therefore to a separate company that is different from the service providers.

In the known process explained with reference to FIG. 8, a number of service providers, freight carriers for example, must be contracted by the service provider before a desired device is at a desired installation site. This leads, for example in the service provider controlling function, to a multiplicity of redundant processes. The existence of a large number of interfaces results in information losses, e.g. in relation to a precise storage site or required calibrations of a service device which can lead to the initially mentioned problems that adversely affect the service quality.

In comparison therewith, the inventive centralized administration of the service devices by the device service provider eliminates a plurality of the—in some cases even redundant—sub-processes and interfaces in the supply process. The overhead for the service device provisioning is therefore reduced overall and the provisioning times can be shortened. Through an end-to-end supply of information with the aid of the data processing system information losses can be avoided and consequently the service quality improved. At the same time the service device inventories can be administered on a cross-regional basis or across all storage locations and so be used efficiently. With an efficient use of the service devices such as this, it may even be possible to reduce existing service device inventories and thus enable the assets of the service provider to be reduced.

More particularly, especially labor-intensive activities on the part of the service provider, such as the recording of delivery and return delivery requests, repair and calibration monitoring and processing and the inventory controlling function, can be eliminated.

The device service provider preferably has a plurality of self-owned additional service devices that the service providers can request for delivery to the desired installation site via the data processing system. The device service provider thus has a pool of devices available which the service providers can access and from which they can take out on loan or lease individual or multiple devices. In this way the availabilities of service devices for the individual service providers can be increased without the service provider being obliged to buy additional devices. Very cost-intensive devices do not need to be bought, but can be leased from the device service provider. It is even possible to reduce the inventory of service devices and hence the assets on the part of the service provider.

According to a further advantageous embodiment of the invention, at least one of the service providers can request a service device of another of the service providers via the data processing system. The service providers can thus access a pool of service devices into which are channeled the devices of at least one, and in the best case, of all the service providers. By this means either the availability of service devices for the at least one, or in the best case for all, service providers can be increased or, if the availability remains constant, their inventories can be reduced and/or the acquisition of devices avoided.

The object directed at the system is achieved according to the invention by a system for supplying a plurality of service providers with technical service devices, each of the service providers being assigned a plurality of service devices in each case and each of the service providers in each case performing services at a number of installation sites that are at different locations from storage sites for their service devices, having a data processing system of a device service provider, to which the respective plurality of service devices is made available by the service providers, for administration of the service devices, whereby the data processing system is accessible to each of the service providers and a delivery of one or more of their service devices to a desired installation site can be requested via the data processing system, means for initiating the delivery of the requested service device(s) to the desired installation site by the device service provider.

The considerations and advantages in relation to the method according to the invention apply analogously to the system according to the invention.

The invention and further advantageous embodiments of the invention according to features of the dependent claims are explained in more detail below in a simplified illustration with reference to exemplary embodiments in the figures. The same reference characters are used for the same elements in the figures.

BRIEF DESCRIPTION OF THE DRAWINGS

FIG. 5: shows an embodiment of a web page providing inventory information, FIG. 6: shows an embodiment of a web page for electronic release by a line manager, FIG. 8: shows in a simplified representation by way of example a known process for providing two service employees SP1 and SP2 of a service provider SDL with service devices.

DETAILED DESCRIPTION OF INVENTION

Figure 1:
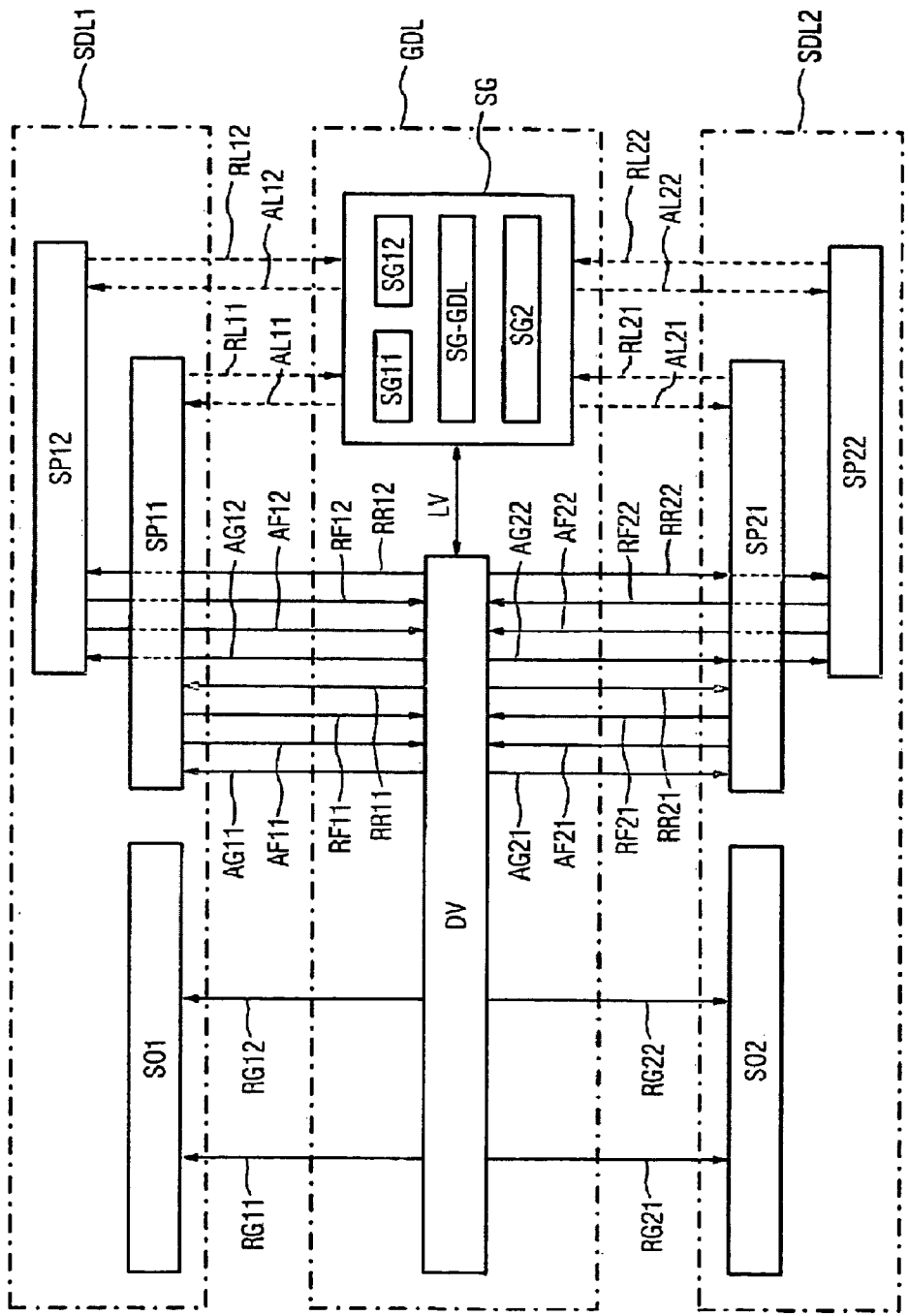
FIG. 1: shows a supply process for service devices according to the invention

FIG. 1 shows a simplified illustration of a process according to the invention for supplying two service employees SP11 and SP12 of a service provider SDL1 with service devices. The service provider SDL1 owns a first number of service devices SG11 and a second number of service devices SG12 which are located at different storage sites in each case and which he has made available to a device service provider GDL.

The device service provider GDL has a data processing system DV for the administration LV of the service devices SG11 and SG12.

The data processing system DV provides the service employees SP11 and SP12 with information about the service devices available to them by means of proposals AG11 and AG12 respectively.

The service employee SP11 can access the data processing system DV and request desired service devices for delivery via a delivery request AF11. The data processing system DV initiates the delivery AL11 of the desired service devices to the service employee SP11 from the device inventories SG11 and/or SG12 by the device service provider.

If, at the end of the service device usage time, the service employee SP11 wants a return delivery of the service devices to their respective storage sites, he transmits a return delivery request RF11 to the data processing system DV, which initiates a return delivery RL11 of the service devices to their respective storage site by the device service provider GDL. Once the return delivery has been completed, the data processing system DV transmits an invoice RG11 to the service organization SO1 of the service provider SDL1. If a recall of the service device is necessary (e.g. because a calibration thereof is required), a recall message RR11 is sent to the service employee SP11 by the data processing system DV, whereupon the return delivery RL11 of the service device by the device service provider is initiated by the data processing system DV.

In an analogous manner the data processing system DV also organizes a delivery AL12 or, as the case may be, return delivery RL11 of service devices following a delivery request AF12 or, as the case may be, takeback request RF12 of a service employee SP12. The associated information flows are designated by the subscripted numerals "12" in the reference symbols.

As can be seen from FIG. 1, the entire processing of the delivery request through to the return delivery of the service devices is handled by the device service provider GDL. Only the device service provider GDL and hence only a single service provider needs to be monitored on the part of the service provider SDL1.

In addition the device service provider GDL has a plurality of self-owned service devices SG-GDL which are likewise administered by the data processing system DV and which can be requested by service employees of the service provider SDL1 via the data processing system DV for delivery to a desired installation site.

In addition the device service provider GDL also supplies a service provider SDL2 with service devices. The service provider SDL2 is assigned the service devices SG2 which he has made available to the device service provider GDL. The service devices SG2 are also administered by the data processing system DV. The service provider SDL2 can access the data processing system DV and request a delivery of one or more of his service devices to a desired installation site via the data processing system DV. Supply processes for two employees SP21 and SP22 of the service provider SDL2 are depicted in FIG. 1 by way of example. The information and material flows correspond to the information and material flows already explained in connection with the service employees SP11 and SP12 and are designated by the subscripted numerals "21" and "22" respectively in the reference symbols.

Overall, the service devices SG11 and SG12 of the service provider SDL1, the service devices SG-GDL of the device service provider GDL and the service devices SG2 of the service provider SDL2 are combined to form a pool of service devices which can be accessed by both the service provider SDL1 and the service provider SDL2, with the result that the availability of service devices for the two service providers SDL1 and SDL2 can be significantly increased.

Figure 2:
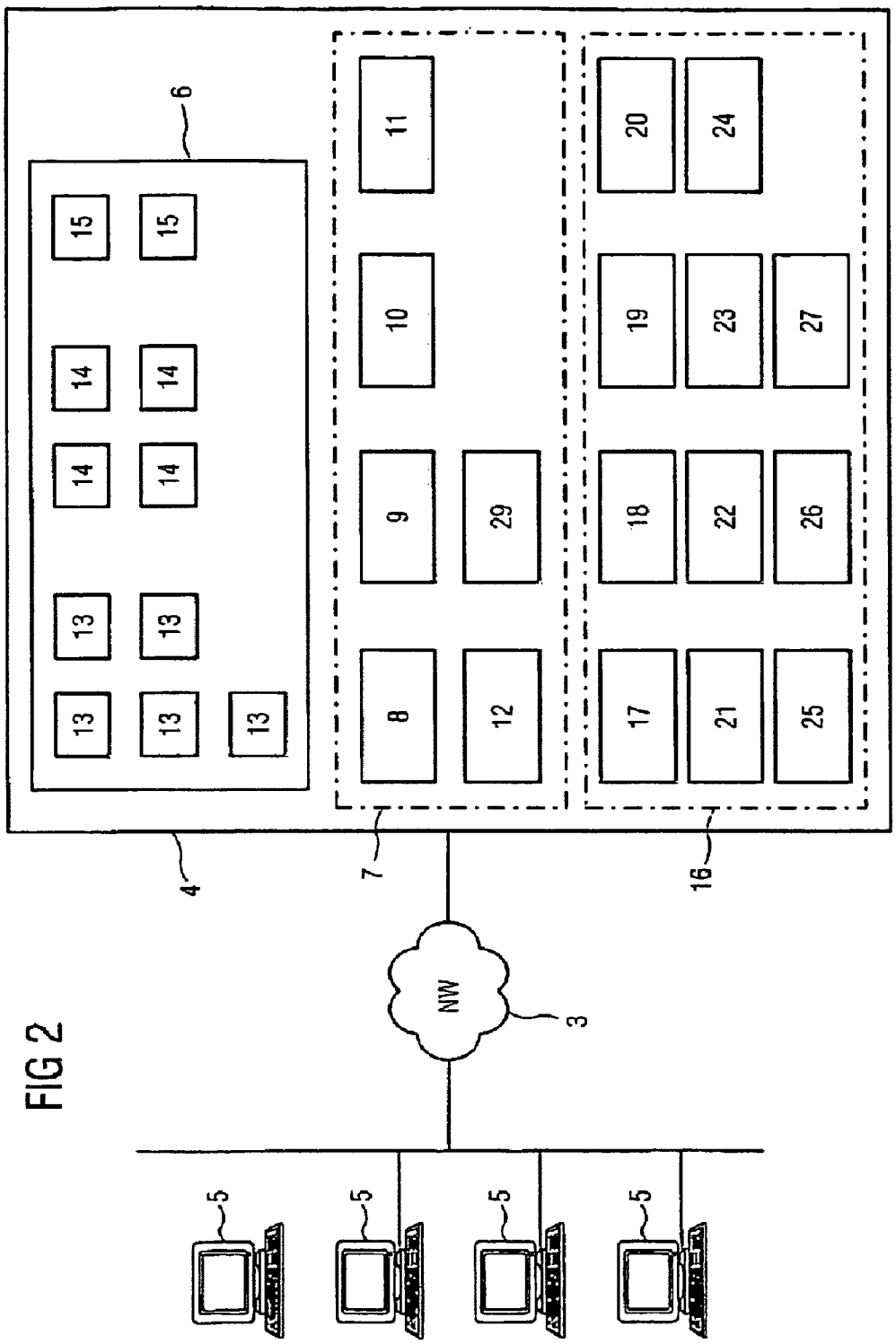
FIG. 2: shows a block diagram of a first embodiment of a system according to the invention

FIG. 2 shows a block diagram of a first embodiment of a system according to the invention. The system 1 has as its central, element a data processing system, embodied as a server computer system 4, of a device service provider for the administration of service devices (not shown in further detail) which either have been made available to the device service provider by one or more service providers or are owned by the device service provider.

The server computer system 4 has a database 6 in which a device data record 13 is stored in each case for each of the service devices, said device data record 13 containing data uniquely characterizing the respective service device in terms of device type, location and user. The location data enables accurate tracking of the location of the service device for fast accesses and short provisioning times. The user data permits a personnel-related administration of the service devices for time- and cost-optimized device deployment.

A device data record 13 preferably additionally includes device owner data, leasing costs data and/or purchase price data. The device owner data specifies to which service device inventory the service device is assigned, i.e. to which of the service providers it belongs or whether it belongs to the device service provider.

The leasing costs data specifies the leasing costs (e.g. per time unit) and the purchase price data the purchase price of the device and are used for the invoicing. According to a particularly advantageous embodiment of the invention the device data record additionally includes a date for a recall of the service device, e.g. for the purpose of a calibration of the service device.

Also stored in the database 6 for each of the service personnel defined by the service providers for service device requests is a personnel data record 14 containing data uniquely characterizing the service personnel in terms of name and associated service provider. In this context service personnel can be a single service employee or a whole group of service employees who can be identified as a group via a personnel data record 14. The personnel data record 14 preferably includes criteria for the validity of a device request and/or a person with release authorization for release of an invalid device request. The personnel data record also has information relating to the service devices assigned to the service personnel.

In addition the database 6 has a service organization data record 15 for each of the service organizations of the service providers. Said service organization data record 15 contains information relating to loan, leasing and purchase conditions as well as addresses for invoicing.

The server computer system 4 additionally has a plurality 7 of web pages which can be sent to a client computer and displayed thereon. A web page 8 for the delivery request serves to display the service devices, defined by the personnel data records 14 in conjunction with the device data records 13. The web page 8 preferably has input fields for selection and requesting of one or more of the displayed service devices as well as for the input of a delivery location and delivery date. A web page 9 for the return delivery request serves to display the delivered devices and for selection and requesting of the return delivery for one or more of the displayed service devices.

The devices pending release can be displayed to a person with release authorization for selection and release via a web page 10 for release of a delivery request. The inventory of available and delivered devices can be displayed for employees of the device service provider or else also for management employees of the service providers via a web page 11 for inventory information. A web page 12 for user identification serves for input of a user identification. An administrator can add, edit or delete device data records 13, personnel data records 14 and service organization data records 15 via a web page 29 Administrator Interface. Further web pages that are not shown can be used, for example, for generating repots, e.g. for displaying calibration reports.

Furthermore the server computer system 4 has a plurality of functional means 16 for executing administration and monitoring functions. Said functional means can be implemented in hardware and/or in software in the server computer system 4. They include:

means 17 for generating a catalog, i.e. for generating a catalog of the service devices that can be requested by service personnel, only the service devices assigned to said service personnel being displayed to the service personnel in each case, means 18 for checking the availability of a requested service device in the service provider's service device inventory administered by the device service provider, means 19 for checking the availability of a requested service device in a service device inventory owned by the device service provider, means 20 for checking the availability of a requested service device in the further service provider's service device inventory administered by the device service provider, means 21 for initiating a purchase of a requested service device, means 22 for checking the validity of a device request from service personnel against the personnel-related admissibility criteria of the service personnel and for outputting a release request to the person with release authorization associated with the service personnel in the event that the device request is not valid, means 23 for initiating the delivery of a requested service device to the desired installation site by the device service provider, e.g. by means of an automatic printout of a delivery note on a printer, means 24 for the automatic comparison of a current date with the date for a recall of the service device and for initiating a return delivery of the service device to the device service provider in the event that the current date exceeds the recall date, means 25 for monitoring for a return delivery request of a service employee, means 26 for initiating the return delivery of a service device following receipt of a return delivery request, and means 27 for cost calculation and invoicing to a service organization.

The interworking and time sequencing of the functional means 16 is accomplished by means of a scheduler that is not shown in further detail.

The server computer system 4 can be accessed via a data communications network 3. The network can be for example the internet and/or an intranet. The network 3 can also contain a mobile network, operating in accordance with the WAP or UMTS protocol for example.

The server computer system 4 is accessed by the service provider via the network 3 by means of the client computers 5. The client computers 5 can be conventional personal computers equipped with a standard web browser, e.g. Netscape Navigator or Microsoft Internet Explorer. However, they can also be mobile computers equipped with a wireless interface, as well as mobile telephones with WAP or UMTS capability. Equally, personal digital assistants with a network interface and also so-called "web pads" can be used as client computers 5.

Figure 3:
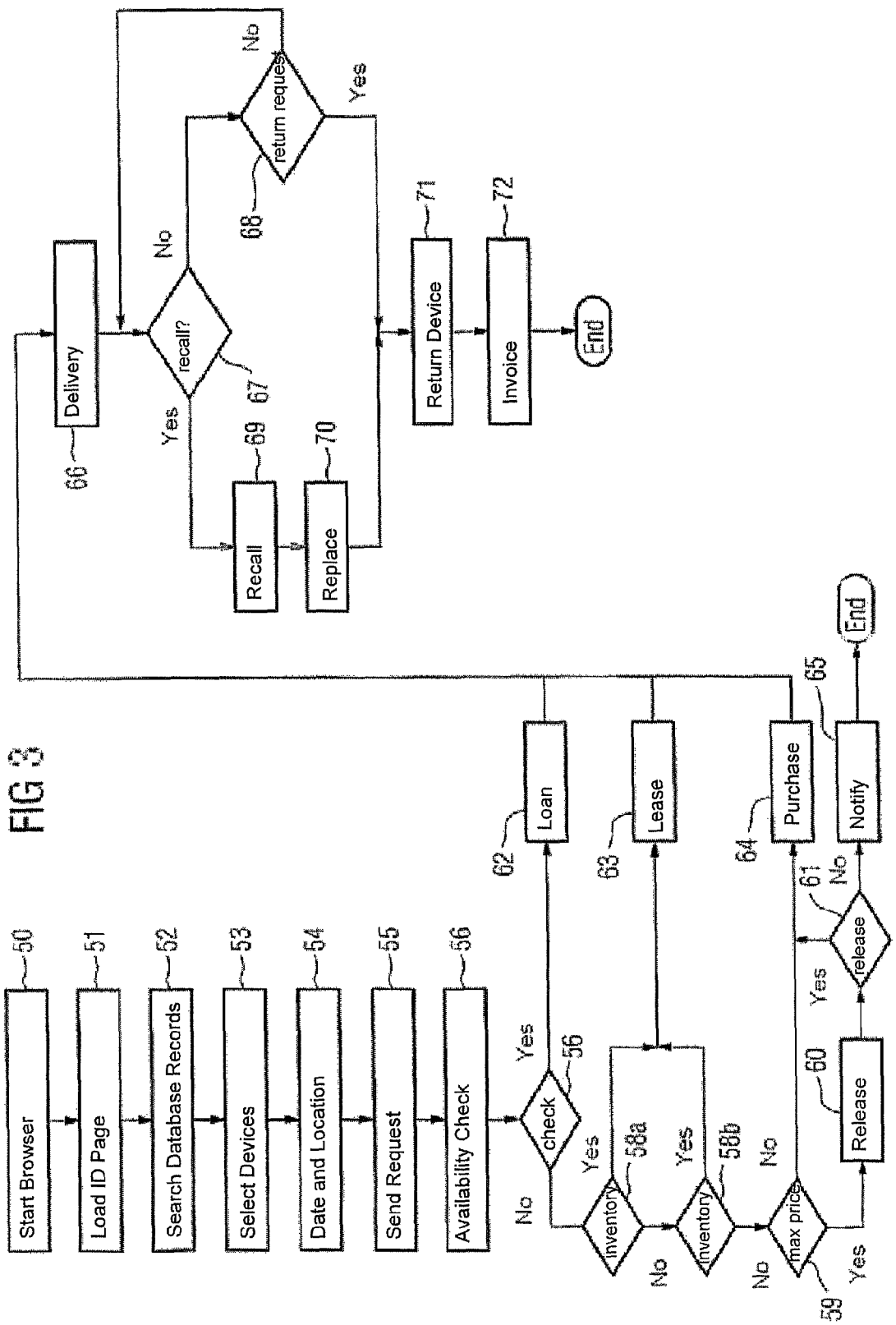
FIG. 3: is a flowchart of an embodiment of the method according to the invention

The interworking of the different components and functional means will now be explained with the aid of FIG. 3, which shows a flowchart of a particularly advantageous embodiment of the method according to the invention. In step 50, a service employee who wants to request a service device first starts a browser program on his client computer 5 and enters the Uniform Resource Locator (URL) of the server computer system 4 of the device service provider.

In step 51, the web page 12 for user identification is loaded onto the client computer 5 of the service employee by the server computer system 4 and the service employee identifies himself to the server computer system 4 by means of his user name.

In step 52, the means 17 for catalog generation of the server computer system 4 searches in the personnel data records 14 stored in the database 6 for the personnel data record associated with the user name and the service devices assigned to the service employee by means of his personnel data record and loads the web page 8 for the delivery request with a catalog of these devices onto the client computer 5 of the service employee. The means 17 takes details listed in the catalog and identifying the devices more precisely, such as, for example, type specifications, from the associated device data records. Thus, by means of the individual catalog generation only the service devices actually relevant to a service employee are displayed for him and laborious search procedures are eliminated.

In step 53, the service employee then selects the desired service devices from the catalog offered to him and in step 54 enters the desired delivery date and the desired delivery location in an input field of the web page 8 for the delivery request. In step 55, the service employee sends his request to the server computer system 4.

In step 56, the server computer system 4 now automatically starts an availability check. First, in step 57, the availability of a requested device in the service provider's service device inventory administered by the device service provider is checked with the aid of the means 18. If the availability in the service device inventory of the service provider is established, in step 62 a loan of the device to the service employee is initiated by the means 23 for delivery and in step 66 a delivery of the service device from the service device inventory of the service provider is initiated.

If there is no availability in the service device inventory of the service provider, in step 58*a* the availability of the service device in a service device inventory owned by the device service provider is checked with the aid of the means 19. If there is availability in the device service provider's service device inventory, in step 63 the service device is leased to the service provider with the aid of the means 23 and in step 66 the service device is delivered from the device service provider's own service device inventory.

If there is no availability in the device service provider's own service device inventory, in step 58*b* the availability of the service device in the service device inventories of the further service providers is checked automatically with the aid of the means 20. If there is availability in one of the service device inventories of the further service providers, in step 63 the service device is leased to the service provider with the aid of the means 23 and in step 66 the service device is delivered from the service device inventory of one of the further service providers.

If there is no availability in the service device inventory of the further service providers, a check is made automatically by the means 21 to determine whether a purchase of the service device is possible. Toward that end, in step 59 the means 21 determines from the device data record associated with the device the purchase price of the device and compares said purchase price with the maximum permissible purchase price stored in the personnel data record of the service employee. If the purchase price is less than the maximum permissible purchase price, a purchase 64 and, following on therefrom, a delivery 66 of the service device is initiated with the aid of the means 23. If the purchase price is greater than the maximum permissible purchase price, in step 60 the means 22 for release monitoring is used to automatically request a person with release authorization stored in the personnel-related data, e.g. the line manager of the service employee, to release (approve) the purchase. This is accomplished e.g. by the sending of an email to the person with release authorization via the network 3. The release approval or rejection is effected with the aid of the web page 10 for release which is sent by the means 22 to the client computer 5 of the person with release authorization.

In step 61*a* check is made to determine whether the purchase has been released by the person with release authorization. If no release is present, in step 65 the service employee is notified thereof, e.g. in the form of an email, and the method terminated. If a release has been approved, a purchase 64 of the device is initiated by the means 21 for initiating purchase 64 and its delivery 66 is initiated by the means 23 for initiating delivery. Once the service device has been delivered, the means 24 for recall monitoring automatically compares a current date with a date for a recall of the service device stored in the device data record. If the current date exceeds the recall date, a recall of the service device to the device service provider is initiated. Toward that end, in step 69 the service employee is notified with regard to the recall by the means 24, in step 70 the delivery of a replacement device to the service employee is initiated, and in step 71 the return delivery of the recalled device by the device service provider is initiated by the means 26 for initiating the return delivery.

If the current date does not exceed the recall date, the means 25 for return delivery request monitoring checks whether a return delivery request relating to the device has been made by the service employee. The service employee can report such a return delivery request to the server computer system 4 by means of an email, for example, or via the web page 9 for the return delivery request. If a return delivery request from the service employee is present, in step 71 the return delivery of the recalled device by the device service provider is initiated by the means 26 for initiating the return delivery. If no, return delivery request is present, a return branch is made to step 67. On completion of the return delivery, in step 72 an invoice is automatically sent to the service employee's service organization by the means 27 for invoicing.

Figure 4:
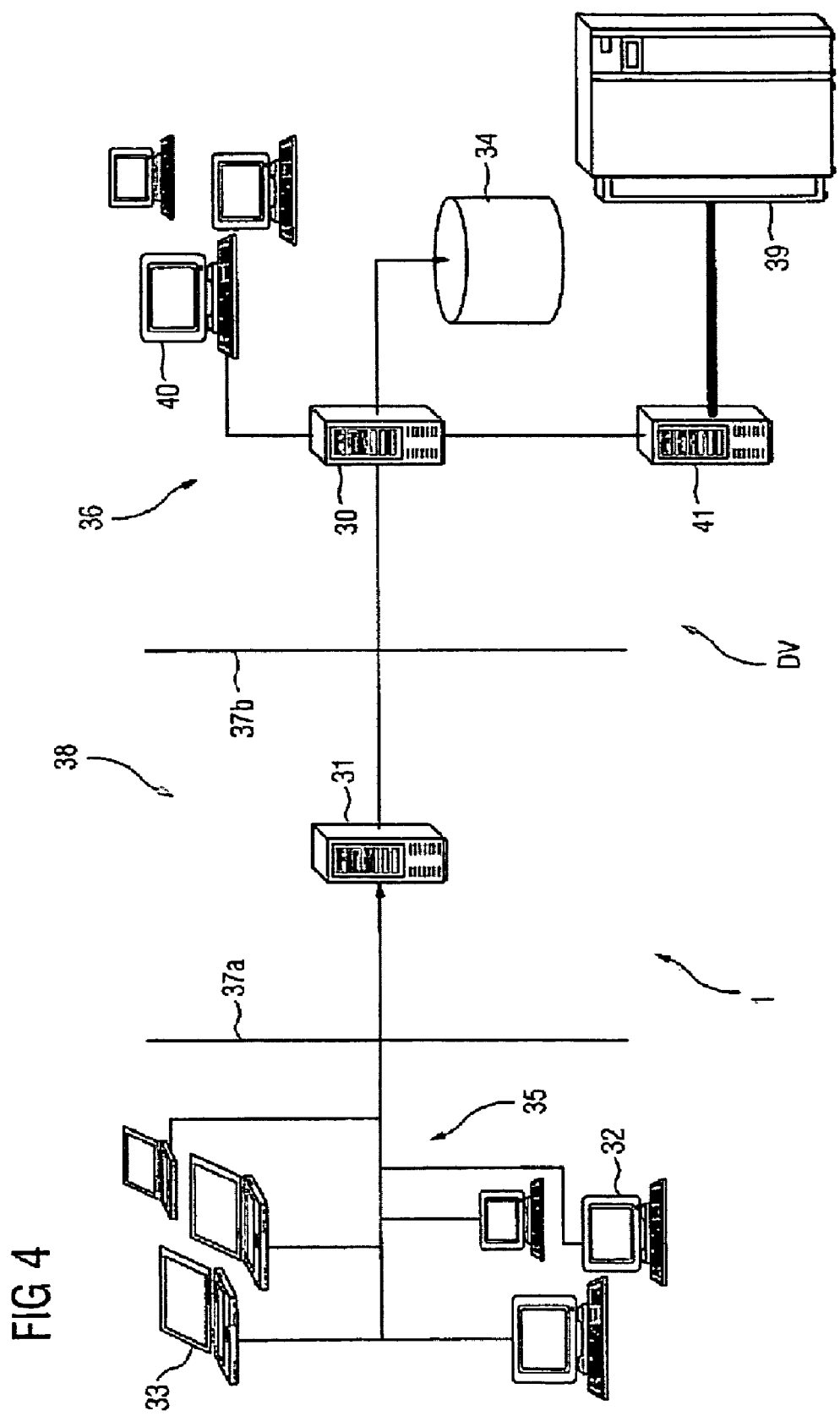
FIG. 4: is a block diagram of a second embodiment of a system according to the invention.
Figure 7:
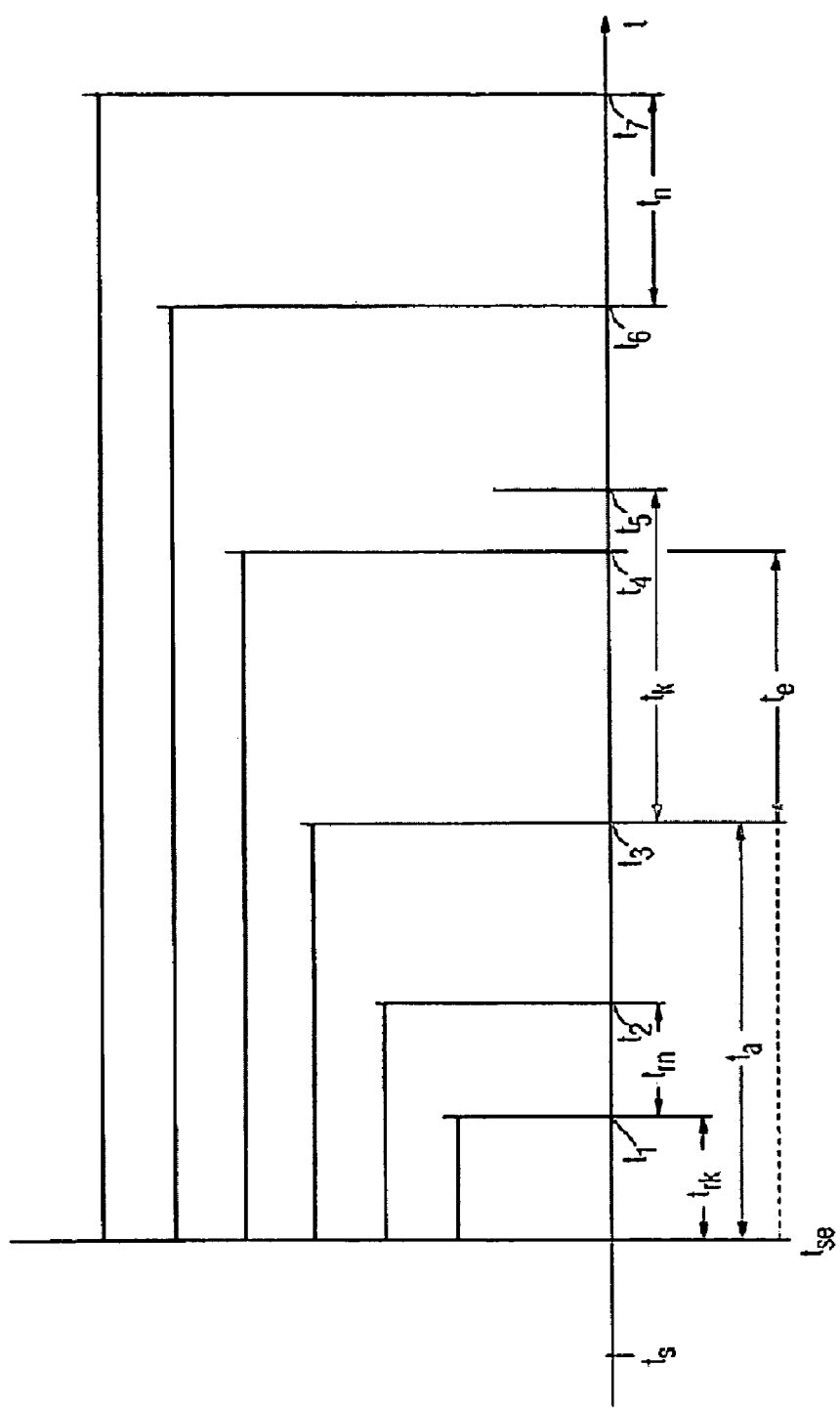
FIG. 7: shows a service process of a service provider for a fault recovery scenario.

FIG. 4 shows in a schematic representation a further advantageous embodiment of a system 1 according to the invention. The system 1 has a data processing system DV comprising a server computer system with a web server 30 which can be accessed by the service providers via client computers embodied as notebooks 33 and/or workstations 32 and the internet 35.

The web pages 7 and functional means 16 according to FIG. 2 reside on the web server 30. The database 6 containing the device data records 13, personnel data records 14 and service organization data records 15 according to FIG. 2 resides on a database server 34 which is connected to the web server 30 and is preferably embodied as a SQL 2000 database server. Employees of the device service provider such as, for example, logistics handlers, calibration departments or administrators can access the web server 30 and the database server 34 via workstations 40 and an intranet 36.

In the exemplary embodiment shown in FIG. 4, a web server 30 and a database server 34 are provided for and can be accessed by all service providers. However, it is also possible for each of the service providers to provide a web server 30 in each case and/or a database server 34 in each case which can then also be accessed only by the respective service provider. The individual web servers can then be interconnected via a data network, via an intranet for example.

Located between the web server 30 and the internet 35 is a firewall 37a. For security reasons many service providers do not allow web servers containing personnel data to be installed immediately behind a firewall, so a further web server 31 with no resident data resource is inserted upstream of the web server 30 as a front-end which only establishes a connection to the web server 30 and the database server 34. A second firewall 37b is located between the web server 31 with no resident data resource and the web server 30. A so-called "demilitarized zone" 38 is implemented by means of the firewalls 37a and 37b.

On the web server 30, server pages ensure a dynamic interaction with a user. From the server pages it is possible to access an EIS layer, that is to say database systems (SQL Server) and EIS systems (Colorado, B.O.S.). In the case of the system 1 according to FIG. 4, a connection to an ERP system 39 of the device service provider is established via a web application server 41.

According to the computer architecture a plurality of responsibility levels (tiers) exist. Specifically, the following logical tiers occur:

A client tier based on thin clients, so that users can access the functionality of the data processing system via their browser.

Two successive tiers composed of web servers which are shielded off from accessing users by firewalls.

An integration tier via which data from different EIS and legacy applications is used, from databases and SAP for example.

An EIS tier in which the actual useful data is permanently stored, that is to say in database systems such as SQL Server and ERP systems such as SAP.

The integration of, for example, Colorado, B.O.S. and the database system is taken into account in the architecture by means of a separate integration tier.

Data security can be ensured via encryption, authentication and authorization, via the database system (SQL Server) for example.

Further examples of the functional scope and a web-based presentation (user interface) of these functions are shown in FIG. 5 for a personnel-related material management system and in FIG. 6 for an electronic release by a line manager.

Preferred application areas for the method and system according to the invention are:

Personnel-related management and administration of the technical service equipment at large organizations with a large number of service engineers (e.g. 5000-10000 service engineers).

Full provisioning of major industrial projects with tools and measuring and testing facilities (e.g. construction site plant)

Procurement, management and administration of technical plant and equipment assets with annual acquisition values of more than €50 million, handling of over 100,000 orders in the leasing and sales business.

Achievable advantages in this case are:

No laborious search procedures for service employees when ordering, since catalogs are already specified and configured on a customer-specific basis in the preliminary phase.

Company investments for the acquisition of high-value measuring and testing devices can be reduced through the use of a calibration pool.

Time- and cost-optimized device deployment based on transparent, personnel-related administration of plant and equipment.

End-to-end process engineering and integration into the service management processes increases productivity in the service organizations.

Reduction of the administration overhead through online information exchange, e.g. for line manager release of orders or electronic sending and archiving of test results and reports.

In principle, instead of being used to supply a plurality of service providers, the method and system according to the invention can also be used to supply only a single service provider with service devices. In this case, however, it would then not be possible to access service devices of a further service provider. Furthermore it is also possible that one or more of the service providers make no service devices available to the device service provider (e.g. because they do not possess any service devices) and so said service providers are supplied with service devices exclusively from the service device inventories of the device service provider and/or other service providers.

The invention further comprises advantageous embodiments of a system:

A system (1), wherein the device service provider (GDL) has a plurality of self-owned additional service devices (SG-GDL) which can be requested for the service providers (SDL1, SDL2) via the data processing system (DV) for delivery to the desired installation site.

A system (1), wherein a service device of another of the service providers (SDL2) can be requested by at least one of the service providers (SDL1) via the data processing system (DV).

A system (1), wherein the data processing system (DV) has means (18) for checking the availability of a requested service device in the service device inventory of the service provider (SDL1 or SDL2), said service device inventory being administered by the device service provider (GDL).

A system (1), wherein the data processing system (DV) has means (19) for checking the availability of a requested service device in a service device inventory owned by the device service provider (GDL).

A system (1), wherein the data processing system (DV) has means (20) for checking the availability of a requested service device in the service device inventory of the further service provider (SDL2 or SDL1), said service device inventory being administered by the device service provider (GDL).

A system (1), wherein the data processing system (DV) has means (21) for initiating a purchase of a requested service device.

A system (1), wherein the technical service devices comprise tools and/or measuring and/or testing means.

A system (1), wherein the service providers (SDL1, SDL2) are connected to the data processing system (DV) via a data communications network (3), in particular the interne and/or an intranet.

A system (1), wherein a device data record (13) is stored in the data processing system (DV) for each of the service devices, said device data record (13) containing data uniquely characterizing the respective service device in terms of device type, location and user.

A system (1), wherein the device data record (13) additionally includes device owner data, leasing costs data and/or purchase price data.

A system (1), wherein the device data record (13) additionally includes a date for a recall of the service device.

A system (1), wherein the data processing system (DV) has means (24) for automatically comparing a current date with the date for a recall of the service device and for initiating a return delivery of the service device to the device service provider if the current date exceeds the recall date.

A system (1), wherein the date for a recall of the service device is a date for the calibration of said service device.

A system (1), wherein the service providers (SDL1, SDL2) have a defined set of service personnel (SP11, SP12, SP21, SP22) who can request service devices and that in the data processing system (DV) there is stored for each of the service personnel a respective personnel data record (14) containing data uniquely characterizing the service personnel in terms of name and associated service provider.

A system (1), wherein the personnel data record (14) includes criteria for the validity of a device request and/or a person with release authorization for the release of an invalid device request.

A system (1), wherein the data processing system (DV) has means (22) for checking the validity of a device request of service personnel against the personnel-related admissibility criteria of the service personnel and for outputting a release request to the person with release authorization associated with the service personnel if the device request is not valid.

A system (1), wherein the personnel-related admissibility criteria include a maximum permitted purchase price.

A system (1), wherein one or more of the service devices are assigned to service personnel in the data processing system (DV) and that means (17) for catalog generation are provided by means of which only the service devices assigned to the service personnel in each case can be displayed in the form of a catalog.

A system (1), wherein the data processing system (DV) has a database (6) in which the device data records (13) and/or the personnel data records (14) are stored.

A system (1), wherein the data processing system (DV) is a server computer system (4).

A system (1), wherein the service providers access the server computer system (4) via client computers (5).

A system (1), wherein the server computer system (4) comprises at least one web server (30).

A system (1), wherein a web server (34) with no resident data resource is installed upstream of the web server 30 as a front-end.

A system (1), wherein the web server (30) is communicatively connected to one or more ERP database systems (39).

The invention claimed is:

1. A method for managing the supply for a plurality of service providers of service devices, the method comprising:
   pooling data regarding a plurality of service devices in an inventory pool as device data records in a database, wherein the inventory pool comprises service provider inventories for service devices owned by each of the respective plurality of service providers and a device provider inventory for service devices owned by the device provider;
   managing the service devices in the inventory pool by a data processing system comprising a computer in communication with the database accessible across a communication network by one or more client computers, wherein the data processing system is programmed to
   (a) receive a request from a client computer of a requesting service provider for a requested service device;
   (b) check the availability of the requested service device, via the computer on the data processing system, by searching the inventory pool in the database by:
      (i) searching an inventory of the requesting service provider in the inventory pool and providing for loaning of the requested service device if located; otherwise,
      (ii) searching the device provider inventory and providing for leasing the requested service device if located; otherwise,
      (iii) searching the service provider inventories of other service providers in the inventory pool and leasing the requested service device if located,
   wherein the service providers have a defined set of service personnel who can request service devices, and wherein in the data processing system is stored for each of the service personnel a respective personnel data record containing data uniquely characterizing the service personnel in terms of name and associated service provider,
   wherein the personnel data record comprises one or more of criteria for the validity of a device request and a person with release authorization for the release of an invalid device request,
   wherein, when a device request is made by service personnel the data processing system checks the validity of the device request regarding the personnel-related admissibility criteria, and wherein, if the device request is not valid, the data processing system requests a person with release authorization associated with the service personnel to initiate a release of the device request,
   wherein the personnel-related admissibility criteria comprise a maximum permitted purchase price, and
   wherein one or more of the service devices are assigned to service personnel in the data processing system, and wherein only the service devices assigned to said service personnel are offered by the data processing system in the form of a catalog for requests.

2. The method as claimed in claim 1, further comprising delivering the requested service device to a desired site of the requesting service provider by the device provider.

3. The method as claimed in claim 1, wherein the following further steps are executed by the data processing system:
   if there is no availability in the inventory pool, providing for purchasing and delivering of the requested service device to the requesting service provider by the device provider.

4. The method as claimed in claim 1, wherein the service devices comprise tools, and/or measuring means, and/or testing means.

5. The method as claimed in claim 1, wherein each of the device data records contain data uniquely characterizing the respective service device in terms of device type, location and user.

6. The method as claimed in claim 5, wherein each of the device data records further include one or more of device owner data, leasing costs data, and purchase price data.

7. The method as claimed in claim 5, wherein each of the device data records further include a date for a recall of the service device.

8. The method as claimed in claim 7, wherein the data processing system automatically compares a current date with the date for a recall of the service device, and wherein if the current date is after the recall date, a recall of the service device to the device service provider is initiated.

9. The method as claimed in claim 7, wherein the date for a recall of the service device is a date for a calibration of the service device.

10. A system for managing the supply for a plurality of service providers of service devices, the system comprising:
   a data processing system comprising a computer executable code, and a computer, accessible across a communication network by one or more client computers;
   a database in communication with the data processing system, wherein the database comprises an inventory pool comprising device data records for service devices, wherein the inventory pool comprises service provider inventories for service devices owned by each of a respective plurality of service providers and a device provider inventory for service devices owned by a device provider;
   wherein the computer executable code on the data processing system, when executed by the computer in the data processing system, performs the steps of:
      (a) receiving a request from a client computer of a requesting service provider for a requested service device;
      (b) checking the availability of the requested service device by searching the inventory pool in the database by:
         (i) searching an inventory of the requesting service provider in the inventory pool and providing for loaning of the requested service device if located; otherwise,
         (ii) searching the device provider inventory and providing for leasing the requested service device if located; otherwise,
         (iii) searching the service provider inventories of other service providers in the inventory pool and leasing the requested service device if located,
   wherein the service providers have a defined set of service personnel who can request service devices, and wherein in the data processing system is stored for each of the service personnel a respective personnel data record containing data uniquely characterizing the service personnel in terms of name and associated service provider,
   wherein the personnel data record comprises one or more of criteria for the validity of a device request and a person with release authorization for the release of an invalid device request,
   wherein, when a device request is made by service personnel the data processing system checks the validity of the device request regarding the personnel-related admissibility criteria, and wherein, if the device request is not valid, the data processing system requests a person with release authorization associated with the service personnel to initiate a release of the device request,
   wherein the personnel-related admissibility criteria comprise a maximum permitted purchase price, and
   wherein one or more of the service devices are assigned to service personnel in the data processing system, and wherein only the service devices assigned to said service personnel are offered by the data processing system in the form of a catalog for requests.

11. The system of claim 10, wherein the data processing system is further programmed to providing for purchasing of the requested service device by the requesting service provider if there is no availability in the inventory pool.

12. The system of claim 10, wherein each of the device data records contains data uniquely characterizing the respective service device in terms of device type, location, user, owner data, leasing costs data, and purchase price data.

13. The system of claim 10, wherein each of the device data records further include a date for a recall of the service device wherein the data processing system automatically compares a current date with the date for a recall of the service device, and wherein if the current date is after the recall date, a recall of the service device to the device service provider is initiated.

14. The system of claim 13, wherein the date for the recall of the service device is a date for a calibration of the service device.

15. The system of claim 10, wherein when a device request is made the data processing system checks the validity of the device request based on personnel-related admissibility criteria, and wherein, if the device request is not valid, the data processing system requests a person with release authorization to initiate a release of the device request.

16. The system of claim 15, wherein the personnel-related admissibility criteria comprise a maximum permitted purchase price.

* * * * *